United States Patent [19]

Duquesné et al.

[11] Patent Number: 4,577,311
[45] Date of Patent: Mar. 18, 1986

[54] PACKET-BASED TELECOMMUNICATION SYSTEM

[76] Inventors: Jean F. Duquesné, 32 rue La Fontaine, 75016 Paris; Boris Rozenwaig, 8, rue Redouté, 92360 Meudon-La-Foret, both of France

[21] Appl. No.: 746,635

[22] Filed: Jun. 20, 1985

Related U.S. Application Data

[63] Continuation-in-part of Ser. No. 333,983, Dec. 23, 1981, abandoned.

[30] Foreign Application Priority Data

Dec. 24, 1980 [FR] France .................................. 80 27513

[51] Int. Cl.$^4$ ............................................. H04Q 11/04
[52] U.S. Cl. ............................................. 370/60; 370/94
[58] Field of Search ...................... 370/58, 60, 92, 94

[56] References Cited

U.S. PATENT DOCUMENTS

| | | | |
|---|---|---|---|
| 4,081,612 | 3/1978 | Hafner | 370/60 |
| 4,251,879 | 2/1981 | Clark | 370/60 |
| 4,314,367 | 2/1982 | Bakka et al. | 370/60 |

FOREIGN PATENT DOCUMENTS 2242829 of 1973 France .

Primary Examiner—Douglas W. Olms
Assistant Examiner—Kenneth I. Rokoff
Attorney, Agent, or Firm—Lowe, King, Price & Becker

[57] ABSTRACT

Multiservice packet telecommunication network in which each packet has inserted in an address field thereof a sequence of addresses respectively assigned to the successive switching network included in a route from a packet sender station to a packet receiver station and defining in these networks groups or bundles of outgoing channels. In each bundle the seizure of an outgoing channel is made by scanning and searching a free channel in the bundle.

1 Claim, 14 Drawing Figures

PACKET-BASED TELECOMMUNICATION SYSTEM

This application is a continuation-in-part of U.S. application Ser. No. 333,983, filed Dec. 23, 1981, now abandoned.

BACKGROUND OF THE INVENTION

1. Field of the Invention

The present invention concerns a telecommunication network for transmitting, receiving and switching digital data packets and, more particularly, a packet-switching network of the multiservice type. Multiservice packet networks serve to transmit, between multiservice subscribers, packets of digital data of different nature for example packetized speech data, visiophony image and sound data and digital information data. Such data originate from several digital data transmit equipments and are intended to digital data receive equipments, the said equipments being located in the subscriber's stations.

The object of the invention is to provide a packet switching network of the multiservice type in which the switching operations are made in real time, in the meaning that the packets are only stored long enough, in a switching unit, for the address of the packet to be read and the connection corresponding to said address to be set up.

The delay taken by a packet for going across a switching network comprises two parts, the first spent in reading out the switching address and the second in implementing the switching operation.

The principal object of the invention is to restrict the duration of the switching operation per se by decreasing the cases when the packet must be stored due to the occupation of the outgoing channel designated by the address.

2. Description of the Prior Art

French Patent No. FR-B-2242821 has disclosed a multiservice packetized telecommunication network comprising subscriber's stations and switching networks connected therebetween through packet transmit channels in which the packets comprise an information field and an address field. At the starting station of the packets, the address field is fulfilled with the address which in each switching network included in the route of the packet designates the number of the outgoing channel to which the incoming channel conveying the packet is to be connected. A pointer word marks the serial number of the address assigned to the first switching network to be encountered in the route and this pointer word is incremented by one unit when it has made its way through a switching network.

All the switching addresses of the switching networks included in the route remain in the address field of the packet during all its travel between calling and called subscribers. Further the packets are stored in incoming and outgoing stores in all the switching networks which they go through the whole network.

It is also known from Patent No. FR-B-2309088 to clear the switching address assigned to a switching network once the packet has been switched in said switching network. Thus, the fulfilled part of the address field of the packet has a decreasing number of bits as the packet goes along its route.

The multiservice packet telecommunication network of the invention comprises:

a plurality of subscriber's stations each connected to several sources of analog data signals and digital data signals and including means for digitizing said analog data signals from those of said sources which are analog data signal sources;

a plurality of means in each subscriber's station for forming, transmitting and receiving packets constituted by said digital data signals and said digitized data signals, said packets having an information field, an address field and a start word and end word fields, said start word field preceding said address field;

packet switching networks, each connected to said subscriber's stations and to other packet switching networks through incoming and outgoing data channels;

means for inserting in the address field of the packet a sequence of addresses including a first, second, ... $n^{th}$ addresses defining the outgoing data link of the first, second, ... $n^{th}$ switching networks included in the route of the packet between a packet sender station and a packet receiver station; and it is characterised in that the outgoing channel from each switching network towards other switching networks and the subscriber stations are associated in groups of a plurality of outgoing channels, the whole group having one and the same address common to all the channels of the group and the switching network further comprises means (342A, 342B) for detecting said common address of a group in the address field of a packet conveyed in an incoming channel; and means (344A, 344B) controlled by said address detecting means for searching a free non-addressed outgoing channel of the group, said searching means connecting said free outgoing channel to said incoming channel.

FIG. 1 shows a graphical example of a nodal system able to comprise the arrangements as in the invention;

FIG. 2 consists of two diagrams showing the make-up of a packet in two different phases of its transmission in a system complying with the invention;

Figure 4:
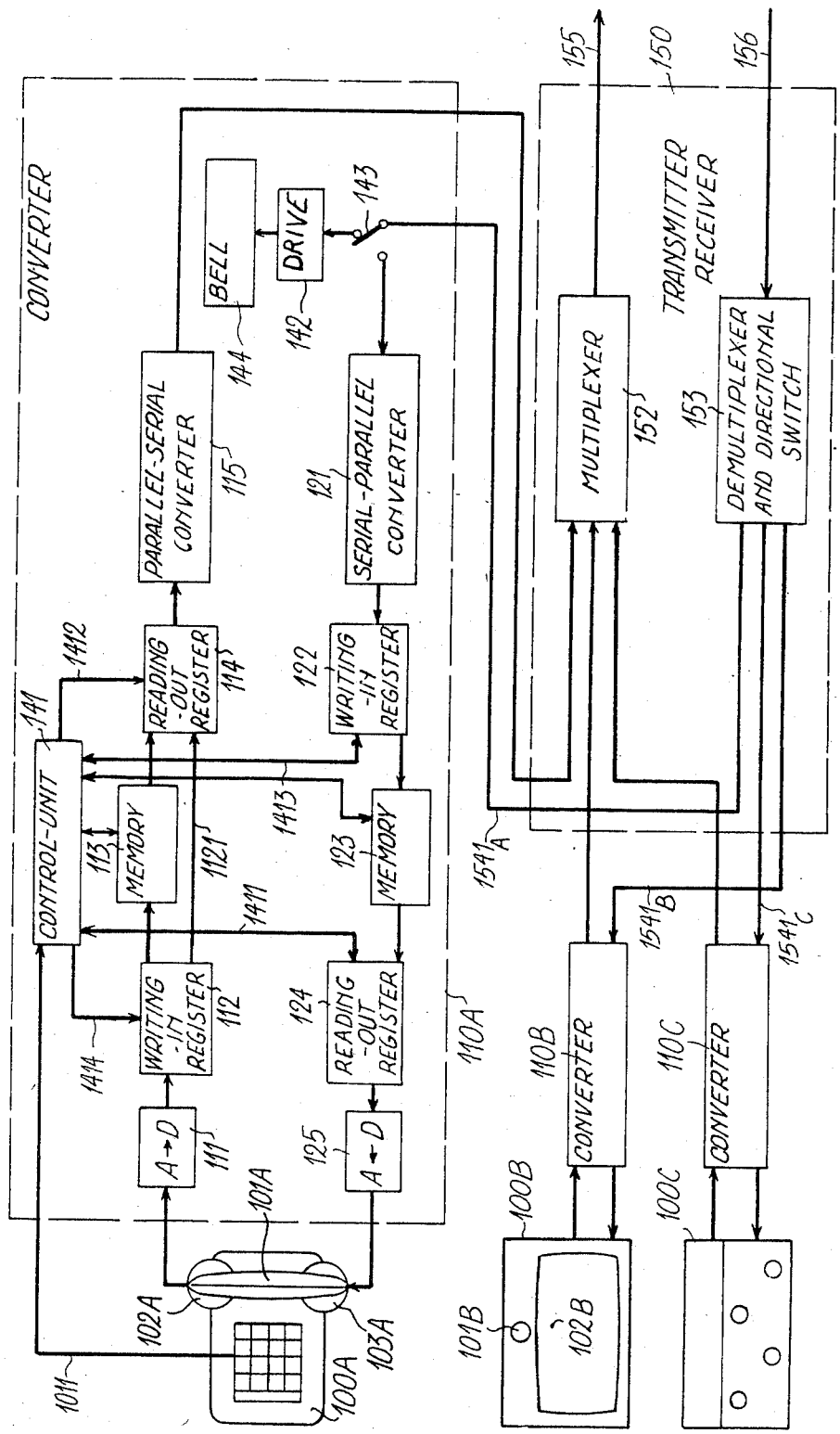
FIG. 4 represents a block diagram of a subscriber station in the system receiving and delivering digital signal packets.
Figure 5:
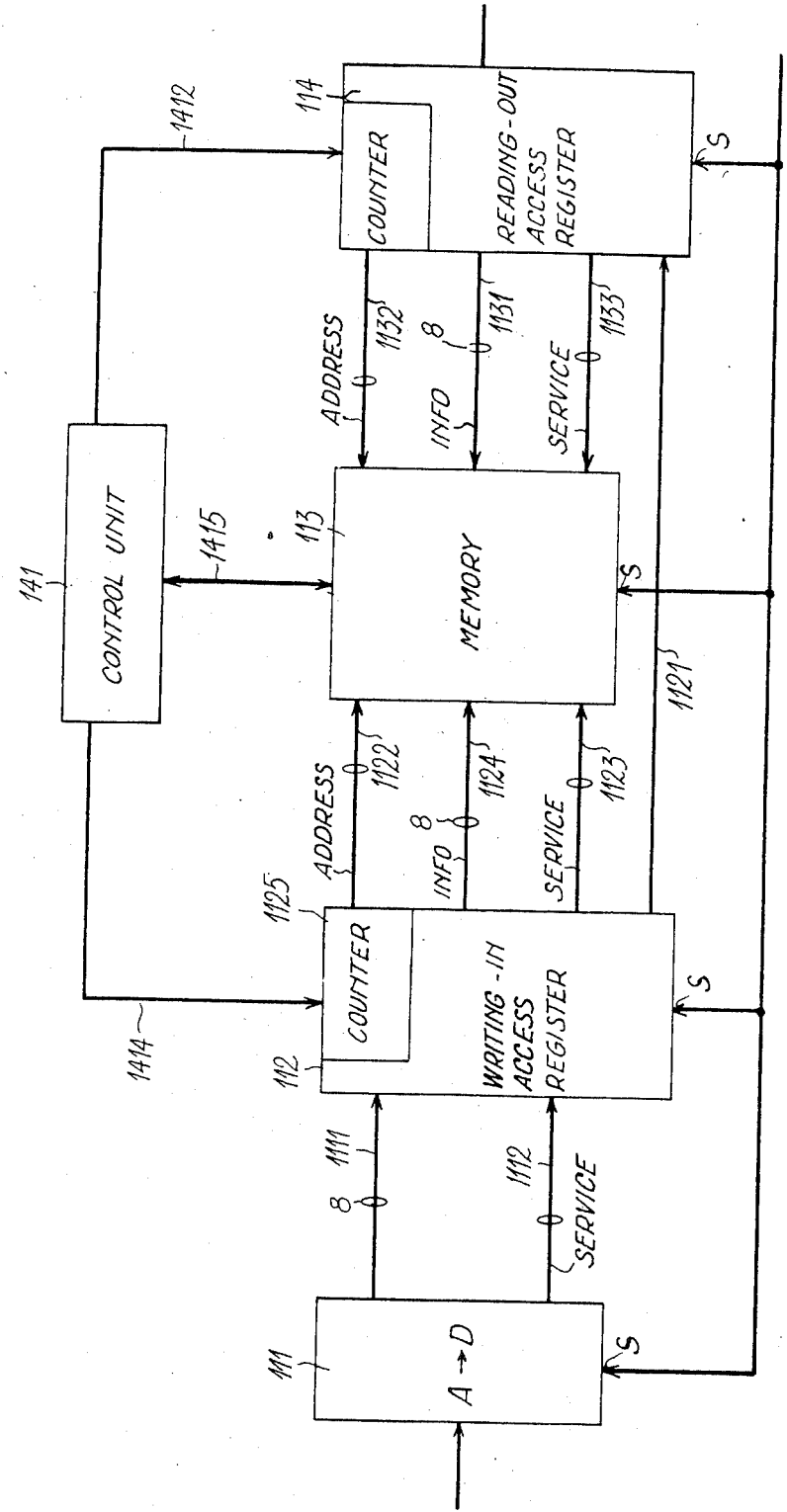
Figure 6:
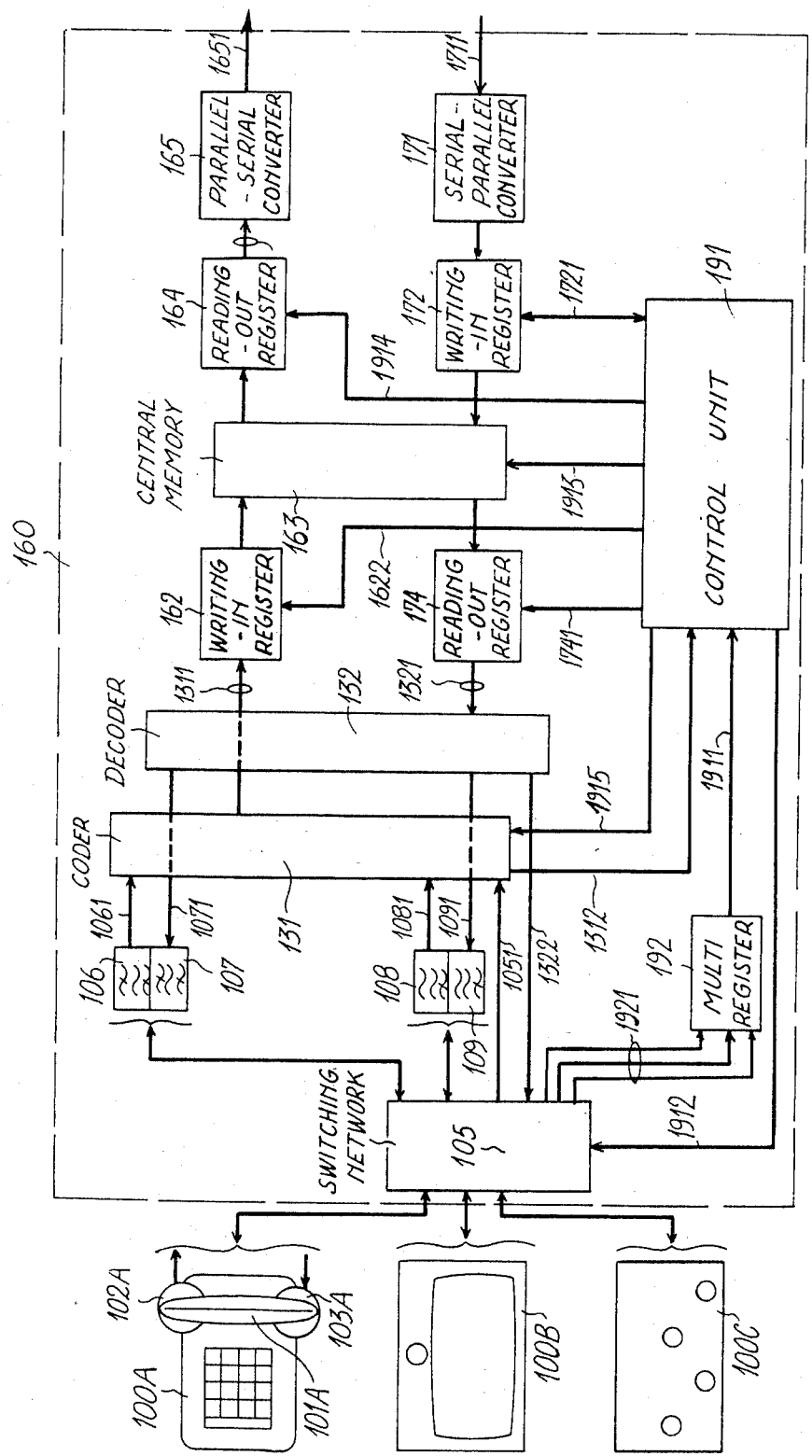
Figure 7:
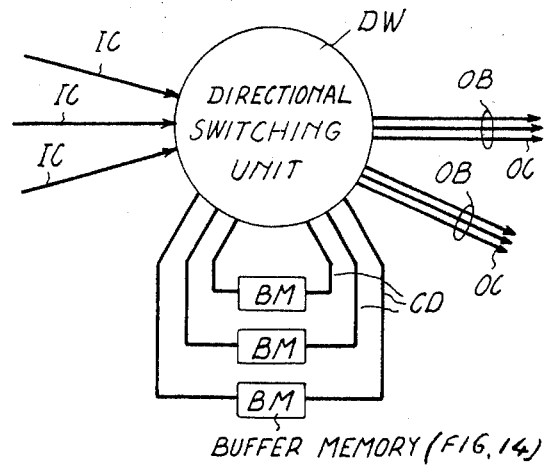
Figure 8:
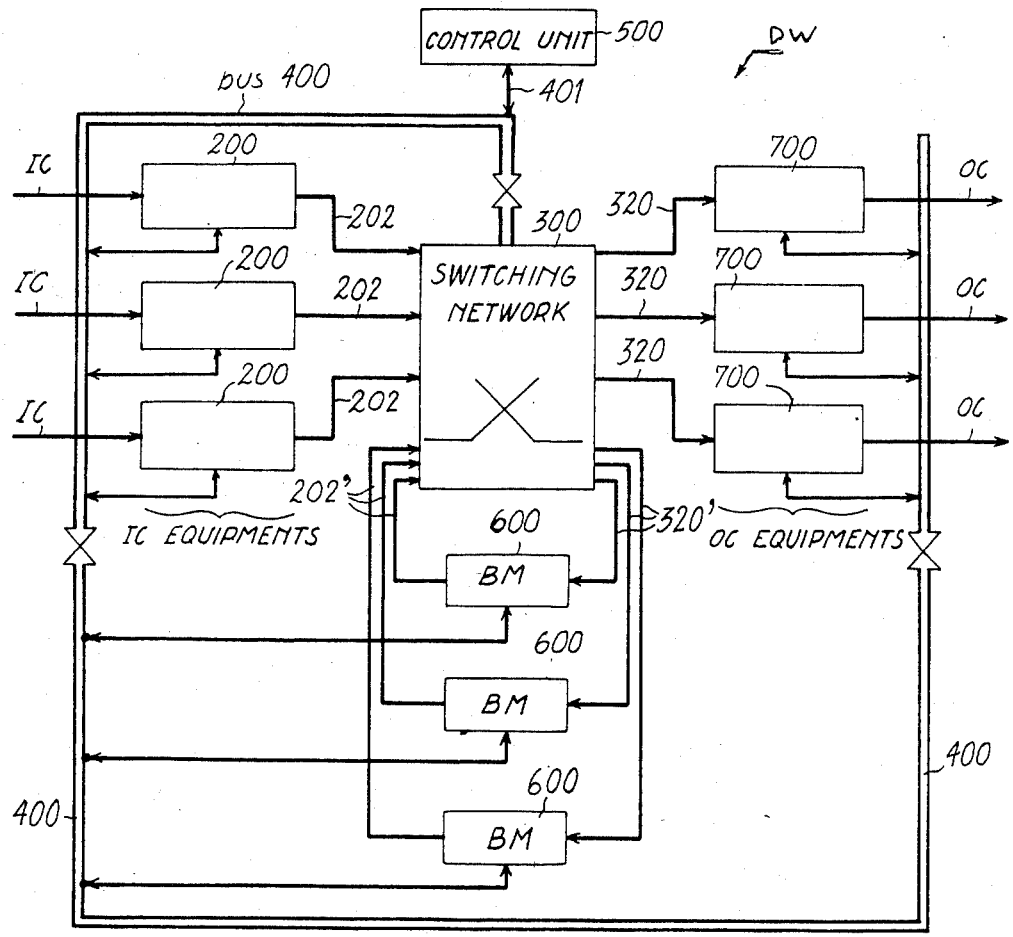
Figure 9:
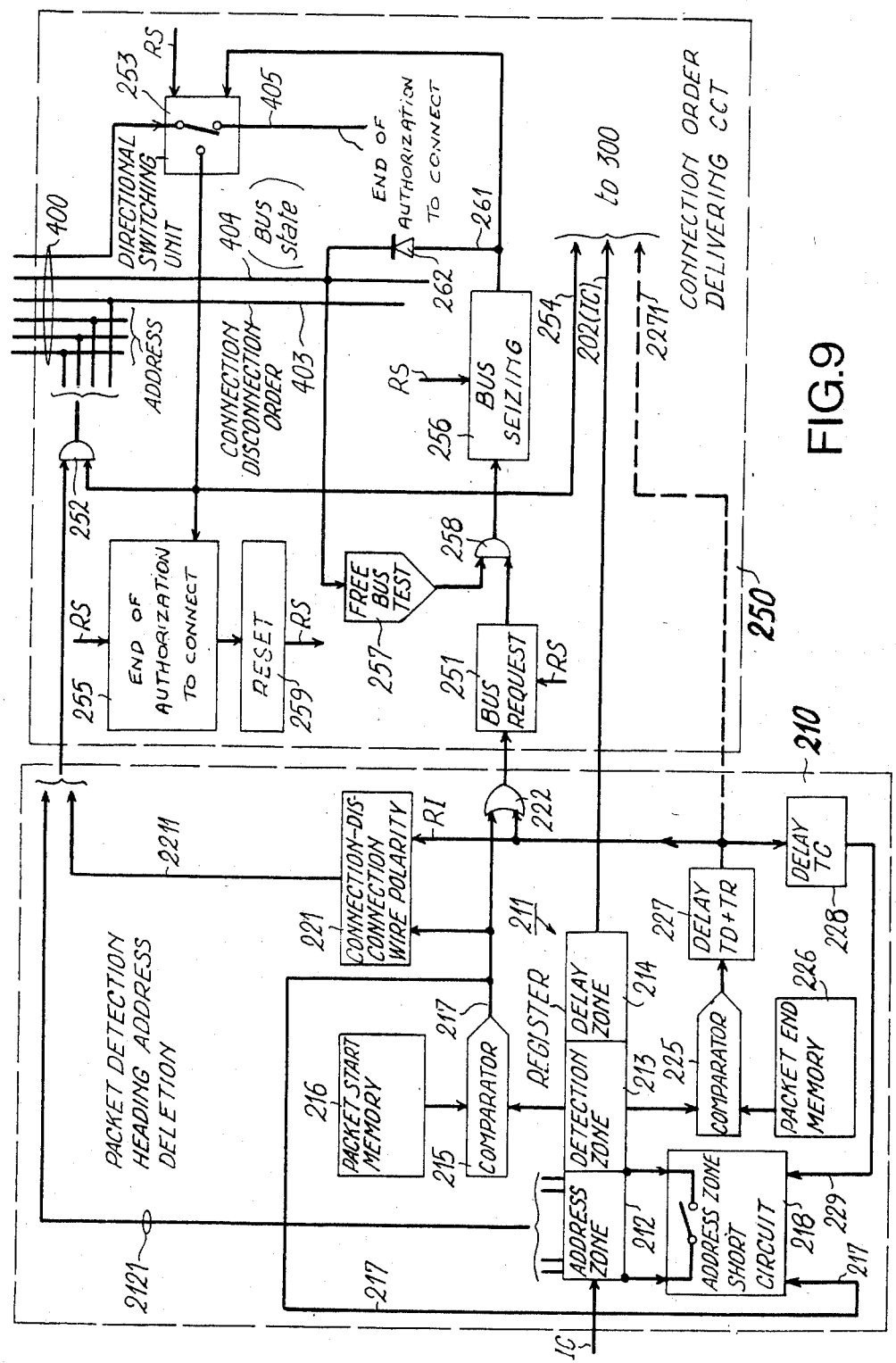
Figure 10:
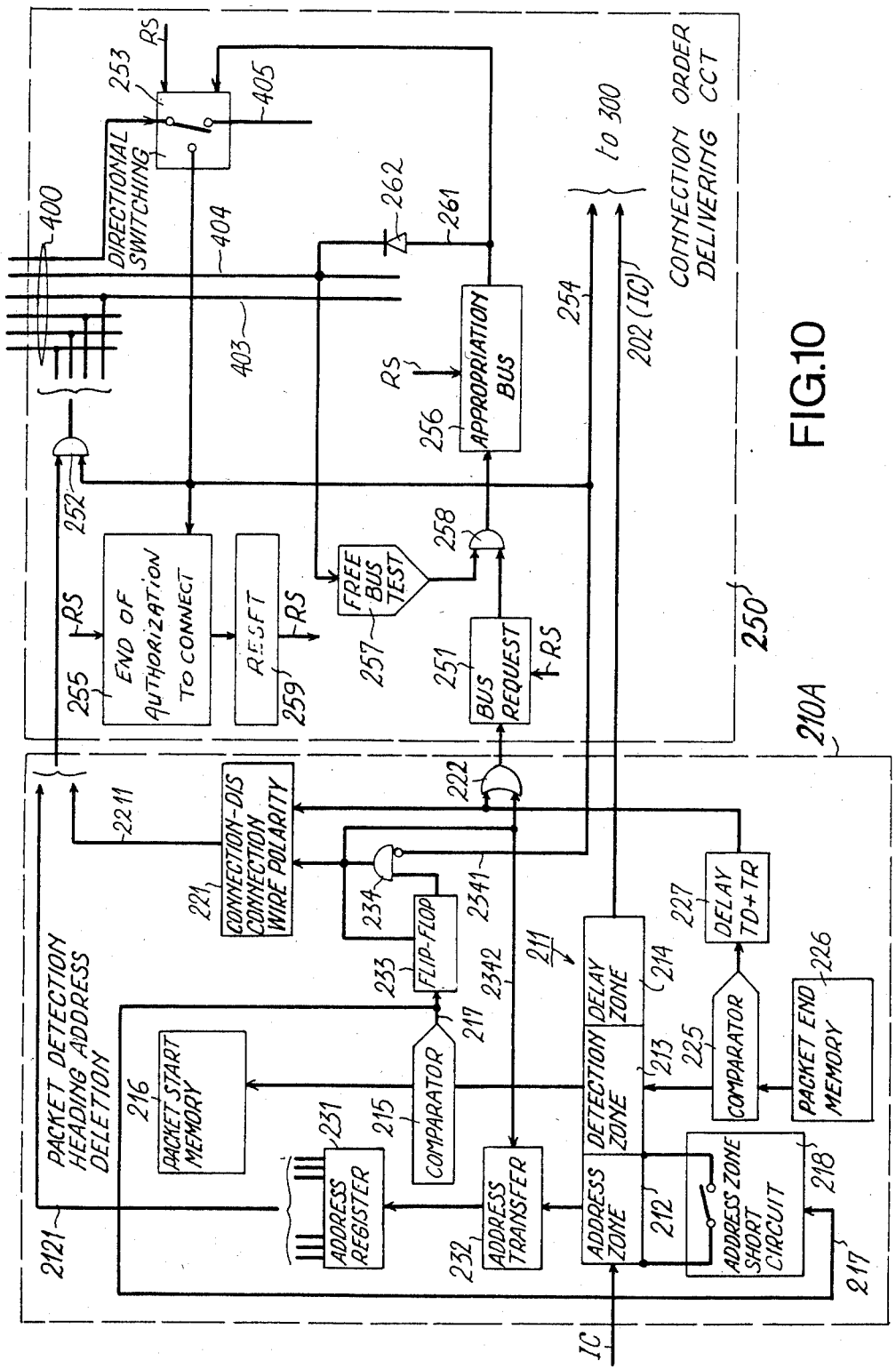
Figure 11:
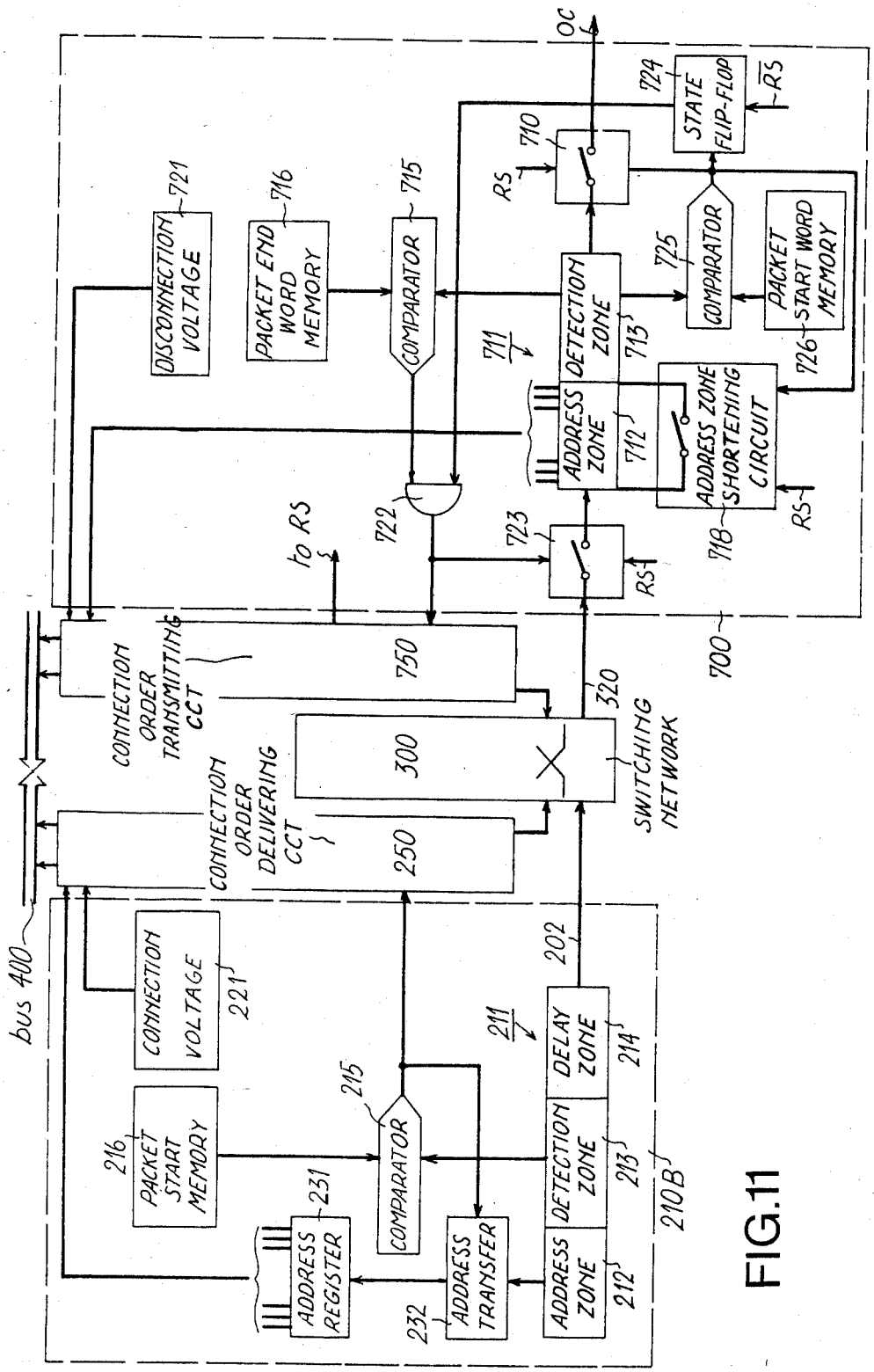
Figure 12:
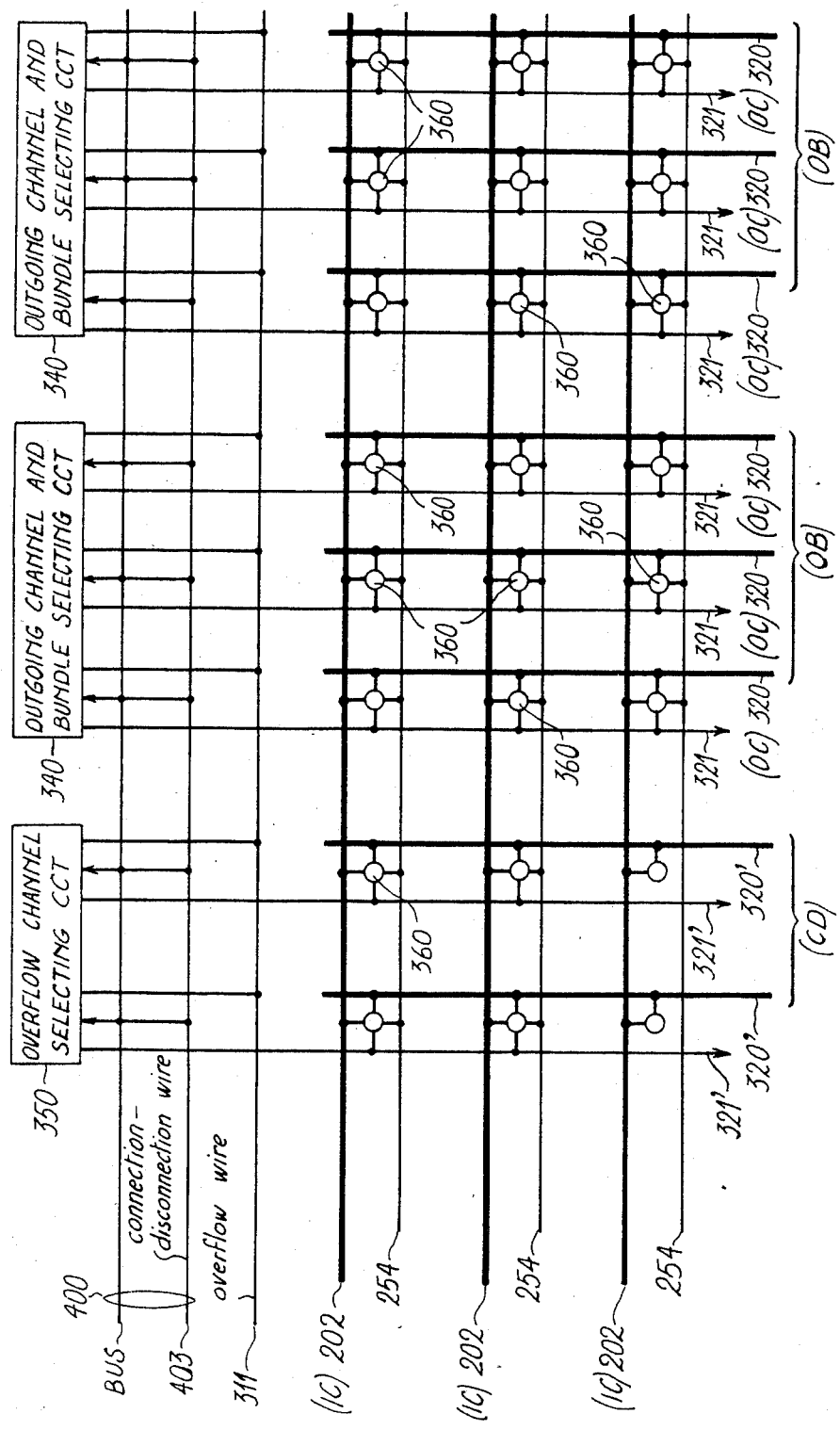
Figure 13:
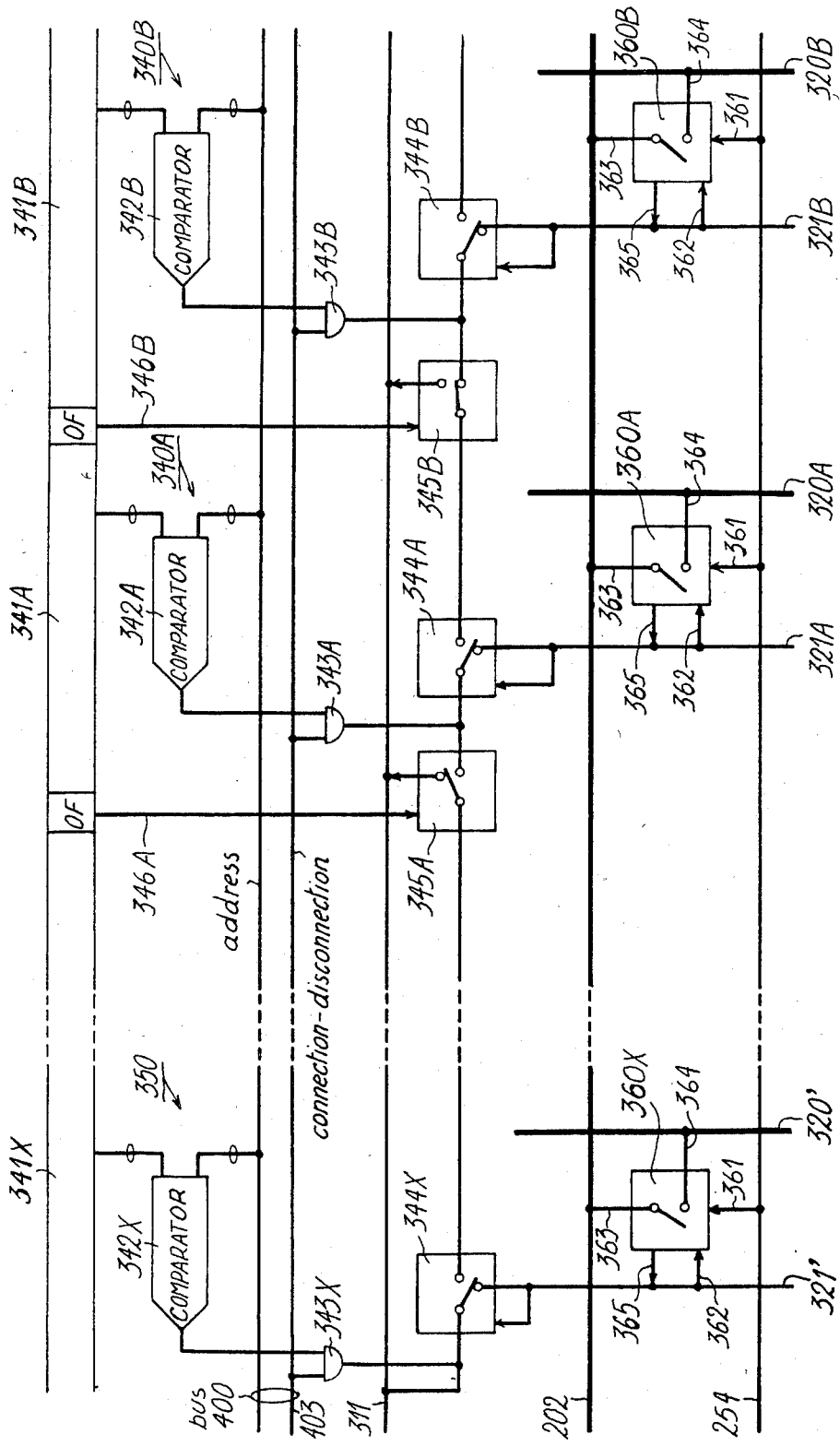
Figure 14:
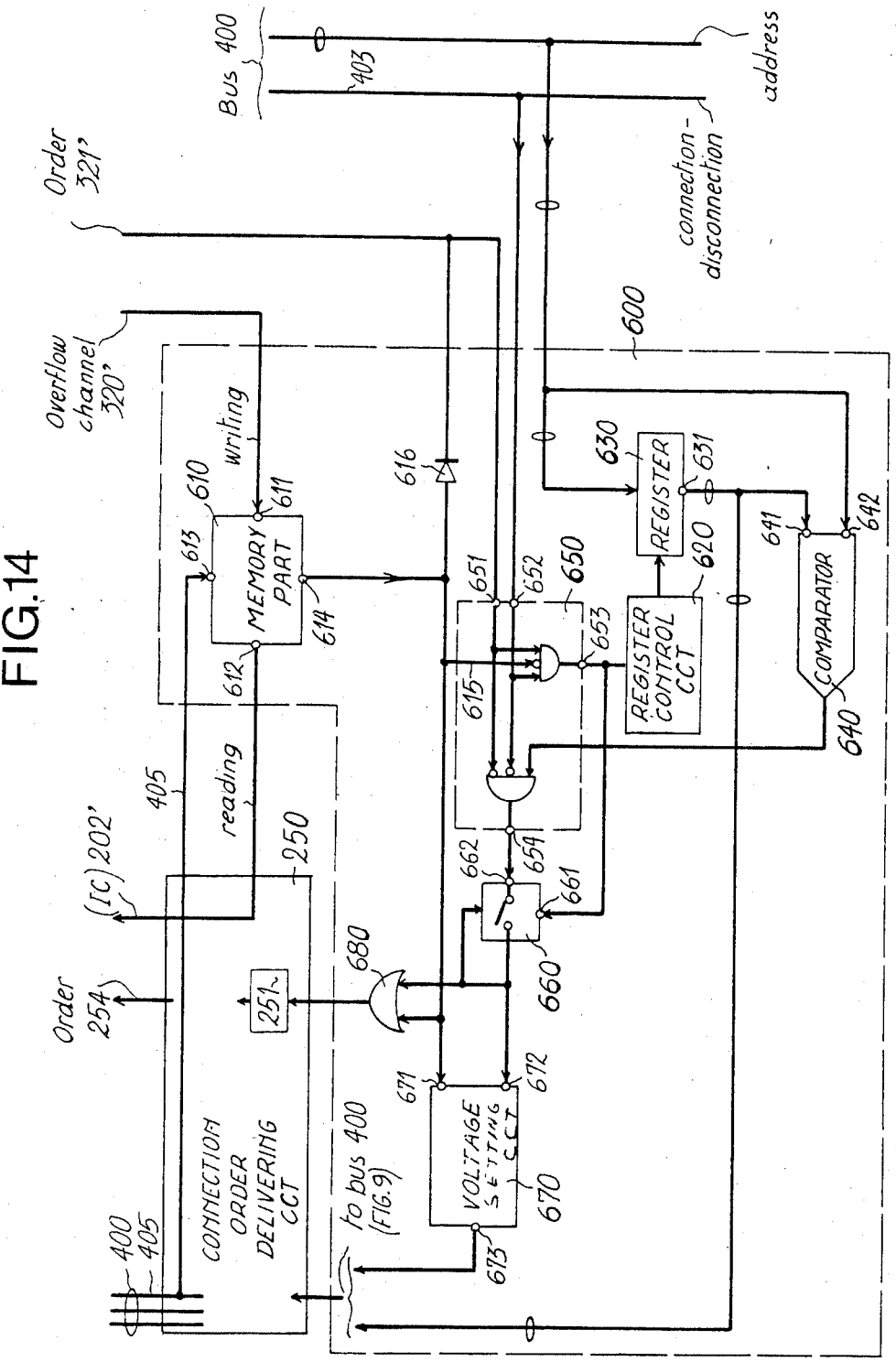

FIG. 5 schematizes memory unit connections in the subscribers station of FIG. 4;

FIG. 6 is a block diagram of a subscriber station fulfilling the same functions as the station in FIG. 4, but in another embodiment form;

FIG. 7 schematically summarized a directional switch as in the invention;

FIG. 8 represents this directional switch in block diagram form;

FIG. 9 schematizes an input channel equipment of the directional switch in FIGS. 7 and 8, as per a first embodiment;

FIG. 10 schematizes an embodiment variant of the equipment of FIG. 9;

FIG. 11 depicts another embodiment variant and a corresponding output channel equipment;

FIG. 12 shows the connection network of the direction switch in FIGS. 8 and 9;

FIG. 13 scehmatizes a switching network unit of this connection network and the associated control unit; and FIG. 14 is a block diagram showing an overflow memory equipment for the said switching network;

With certain exceptions, all the diagrams represented in these figures are simplifications in which certain components whose function and lay-out are well-known such as clocks, synchronizing means or supply sources, have not been shown.

Figure 1:
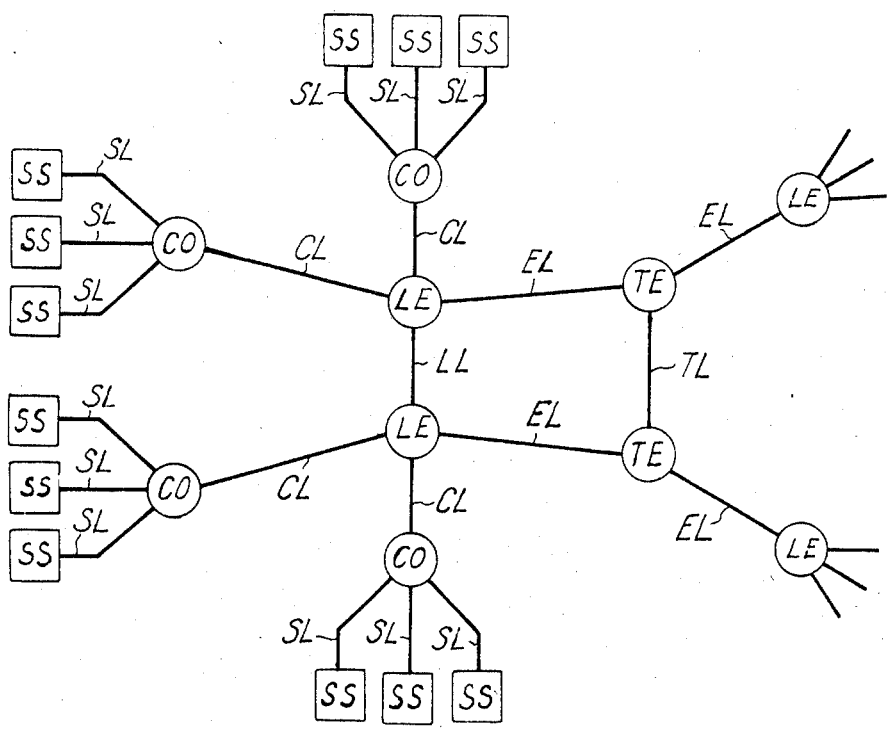

Consideration will first be turned toward FIG. 1 which shows a portion of a nodal telecommunication system comprising, in its complete state:

a plurality of subscriber stations SS each of which includes at least one terminal whether this be a telephone, a visiophone, a data transmission terminal, etc. When a station has several terminals, these can be either all the same or mixed;

concentrators CO to each of which stations SS are connected through subscriber's lines SL;

local exchanges LE to each of which concentrators CO are connected by concentrator links CL where these local exchanges can, moreover, be interconnected through local links LL;

transit exchanges TE to ech of which local exchanges LE are connected by exchange link EL, where these transit exchanges can be interconnected through transit links TL.

In case the message packetizing operation is carried out in circuits housed in the stations SS, the entire system in FIG. 1 constitutes a system in accordance with the invention. If the routing digital address insertion circuits are also contained in these stations SS, then all the system nodes, namely concentrators CO, local exchanges LE and transit exchanges TE become switching networks in compliance with the invention and the links CL, EL and TL are input links to and output links from these switching networks. As an input link, they may have at least one channel but as an output link they must have a plurality of channels (channel group or channel bundle). However, and still within the scope of the invention, the address insertion into the addresses field can be transferred to the concentrator CO or local exchange LE level.

It will be assumed for the moment that these address inserting circuits are housed in the subscribers station SS. Before describing an embodiment example of one of these stations however, the make-up of a complete packet comprising an information content, and an address field will be described.

Figure 2:
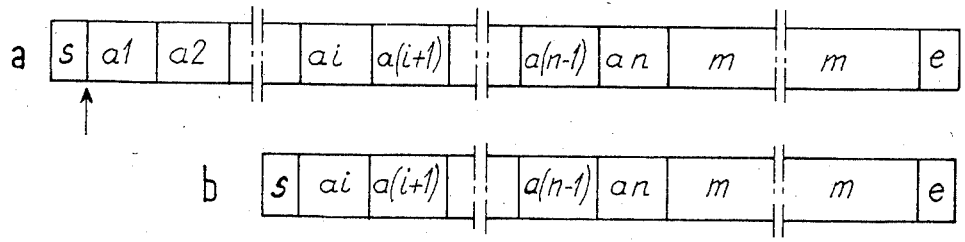

Diagram 2a of FIG. 2 gives an example of such a complete packet that comprises the words of groups of words as in the following chronological order:

s: packet start word;

a1, a2, ... an: routing words or fields designating the outputs of the switching network through which the packet must travel to reach its destination;

m: message fragment constituting the packet information field;

e: packet end word.

It will be stated that a packet such as this is "self-rounted" since it includes all the indications essential to its passage through the system. The word s will advise each directional switch encountered of the arrival of a packet that must switch in real time along a free channel in its output bundle or in one of its output bundles. The word e will advise it that it can free the channel that was tied up during the packet flow. It should be recalled that the address fields are intended for the respective directional switching units, the packet is to meet during its passage and not for the switching networks themselves that can encompass one or several directional switching units. The address field can only relate to the directional switching units included in the switching networks.

The directional switching units may be designed as one of two versions. In the first (referred to as "address-saving" directional switching unit), the packet keeps its initial field from one end to the other of its route; it thus remains in keeping with diagram 2a. It must however also include a "pointer" positioned as indicated by an arrow, i.e. between the words s and a1. The value of this pointer is incremented by unity steps upon passing through each directional switching unit encountered to enable the next directional switching unit to recognize the output bundle concerning it from the rank thereof.

In the second version, consideration is taken into account of the fact that the addresses already used during packet switching operations become useless and each directional switching unit comprises means for deleting the address concerning itself in the address field of the packet it receives and retransmits. The address in the address field, therefore shortens as the packet follows its route. The address intended for a directional switching unit encountered is always located in the first packet address field, thereby doing away with any need for a pointer. The address field may for instance, have the make-up given by diagram 2b in FIG. 2 upon leaving the switching unit with an address a (i-1). It now contains only those addresses with indices at least equal to i. The address ai will disappear when travelling through the following directional switching unit. The deletion of an address causes deletion of the start word s of the start field of the packet that precedes this address. This word s must be reintroduced by the directional switching unit prior to retransmission of the packet.

Between the moment when a directional switching unit has recorded the packet route address and the moment when it establishes the link between the packet input channel and the output channel it must take, a certain period of time goes by which might give rise to a loss of information. This loss may be obviated by adding a delay line to the switching unit which introduces a set delay between the arrival of a packet present in an input channel and the retransmission of the preceding packet towards an output channel. This delay is more significant in the event of the directional switching unit being of the address-saving type since this type must await the arrival of its address prior to effecting the corresponding connection.

Figure 3:
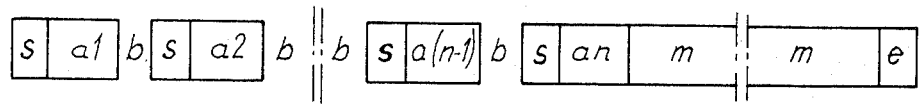
FIG. 3 shows another packet diagram.

The addition of such a delay line can be avoided when adopting the configuration offered in FIG. 3. Every address a1, a2, etc ... is preceded by the packet-start word s. In addition to this, a sufficient long "blank" b is inserted between each address and the packet-start word that perhaps follows it in order to account for the switching time.

Consideration will now be given to FIG. 4. It depicts a subscriber station embodying the invention whose terminals are:

a keyboard telephone 100 A;

a visiophone 100 B where solely camera lens 101 B and screen 102 B have been shown;

a data transmission terminal 100 C.

Each of these terminals communicates with the system via a converter 110 A, 110 B and 110 C respectively whose functions are as follows:

perform analog-to-digital conversion for transmission and digital-to-analog conversion for reception;

cut the emission messages into packets and provide the packet with start and end fields and an address field;

reconstitute the reception messages by concatenation of the packets received.

In the station under consideration here, the functions are thus decentralized to extremes since each terminal has its own converter. Each converter, namely 110 A, 100 B and 110 C, communicates with the local exchange to which the station is connected by means of a multiplexer 152 and demultiplexer 153.

The three converters are identical as regards their principal in lay-out, apart from the fact that converters 110 A and 110 B are provided with analog-to-digital and digital-to-analog converters that are superfluous in converter 110 C and that converter 110 B can concurrently handle two, or indeed more than two separate signals (speech, luminance signal, chrominance signal). Consequently, a description will only be given of converter 110 A. It comprises:

a control unit 141 whose role will be broached later on and a transmission chain which includes an analog-to-digital converter 111, connected to the telephone microphone 102 A, a writing-in register 112, a transmit memory 113, a reading-out register 114 and a parallel-to-serial converter 115 connected to multiplexer 152 of transmitter-receiver 150;

a reception chain which includes a serial-to-parallel converter 121 connected to demultiplexer 153, a writing-in register 122, a receiver memory 123, a reading-out register 124 and a digital-to-analog converter 125 connected to the telephone receiver 103 A.

Multiplexer 152 of transmitter-receiver 150 multiplexes the output signals of terminals 100 A, 100 B, 100 C and directs the multiplexed signal towards the local exchange LE via line 155.

Demultiplexer 153 demultiplexes the signals that emanate from the local exchange via line 156 and directs them towards the corresponding inputs of converters 110 A, 110 B and 110 C.

For the sake of simplification, the time bases serving to synchronize, on the one hand, the components of each converter and, on the other hand the transmitter-receiver components have been omitted from FIG. 4.

When the subscriber lifts his handset 100 A, this causes control unit 141 to be energized. Control unit 141 operates reading-out register 124 via line 1411 and this register sends to the handset receiver a dial tone periodic signal, a period of which is stored in a particular zone of memory 123. This digital signal is analogically converted by converter 125.

When the subscriber dials the called party's number, the dialing pulses are set to control unit 141 via line 1011. The latter unit using these pulses, constitutes a service packet referred to as a "call packet" that, in its address field carries the routing address of any service packet (e.g. the zero address) and whose information content incudes the subscriber's number and where necessary his extension number and the called party's number. It then invites reading-out register 114 via link 1412 to transmit this call packet towards the local exchange via transmitter-receiver 150. It causes writing-in register 122, via link 1213, to mark the zone in memory 123 in which the reply is expected and then sets itself on stand-by.

The reply from the local exchange (ringing tone, busy or route search tone) is directionally switched to memory 123 via transmitter-receiver 150, register 121 and writing-in register 122. Control unit 141 is informed by register 122 of the arrival of this reply, then advises register 124 of the zone of memory 123 in which is tored the corresponding digital signal to be routed towards rceiver 103 A of telephone 100 A.

When the called subscriber lifts the handset, the local exchange informs control unit 141, via transmitter-receiver 150, converter 121, register 122 and memory 123. This information is made in the form of a service packet whose address field contains the addresses for directional switching towards the called party, or in other words, the numbers of the output channel group in each switching unit comprised in the route of the packets. Control unit 141 then instructs registers 112, 114, 122 and 124 in which zones of memory 113 and 123 they should operate in alternance. The zones designated by access registers 112, 122 and 124 contain packets with only an information field. The zones in memory 113 controlled by reading access register 114 contain packets with both an information field and an address field together with a packet start and a packet end word. As regards writing access register 122, it deletes the residual address signals of the packets it receives or better still directionally switches them towards control unit 141.

It will be noted that an output from writing access register 112 is directly connected to an input into reading access register 114 via a link 1121. This enables access register 114 to be directly informed that access register 112 has filled a buffer zone in memory 113. Access register 114 then transfers the corresponding packet to converter 115.

Lines 1413 and 1411 also enable access registers 122 and 124 to advise control unit 141 of the start and end moments of the writing or reading operations of packets in a memory. Control unit 141 can therefore, if required, slave the reading rate in access register 124 to the average packet-arrival rate by means of appropriate orders delivered to the said access register.

It can be seen in FIG. 4 that a drive circuit 142 is connected to input line 1541 A to a converter 121 said link coming from demultiplexer 153. The connection is made via a relay 143 governed by hanging up handset 101 A. When the subscribers in question is called, the drive circuit triggers a bell 144 when the said circuit recognizes a bell control service packet delivered from demultiplexer 153 and it stops the said bell when it recognizes a bell interruption service packet. The action of lifting handset 101 A causes direct connection of converter 121 to demultiplexer 153, via relay 143. Drive circuit 142 can optionally fulfil functions other than controlling the bell. These other functions can cover, for example, display of the called party's number that can be systematically transmitted in the bell control service packet, control a printer recording the time-stamped calls and/or charges information, operation of an automatic message recorder, etc . . .

By way of an example, with reference to FIG. 5, below is a short functional description of memory 113, access registers 112 and 114 and control unit 141 belonging to coverter 110 A.

FIG. 5 also shows analog-to-digital converter 111 and the links between components 111, 112, 113 and 114 and a time base that has not been represented here (inputs S). It is assumed that the information is transmitted between these components in octet form.

Converter 111 acts as a coder and is connected to writing-in access register 112 via a bus comprising eight information wires 1111 and service wires 1112. The clock pulses are applied to input S and enable the coder to know the instant when it can begin coding.

The bus between access register 112 and memory 113 comprises eight information wires 1124, address wires 1122 and service wires 1123. The bus between memory 113 and reading-out access register 114 comprises eight information wires 1131, address wires 1132 and service wires 1133.

Control unit 141 specified via link 1414 to writing-in access register 112 in which zones in memory 113 it must successively store the octets that reach it via wires 1111. Access register 112 carries a counter 1125 that is set to the firt address in the first memory zone determined by control unit 141 and whose content is delivered by address wires 1122 in order to define the octet address in the first memory zone. Once the counter content has overstepped the last address in the first memory zone and therefore that zone is filled, the counter is reset to the first address of the other memory zone. Writing-in access register 112 then advises reading-out access register 114 via link 1121 that the first packet is in the first memory zone.

The memory is of the conventional octet random access type. Its capacity is such that it has two zones for storing two successive packets and, when necessary, service signals.

Other types of memory can advantageously be employed, such as for example CCD sequential access memories.

Control unit 141 specifies via link 1412 which memory zones reading-out access register 114 has to read alternately. These zones comprise the information zones addressed by counter 1125, preceded and followed by the packet start word and the packet end word. The packet start and packet end word can be added to the information field by control unit 141 itself through bus 1415 or by reading-out access register 114.

The majority of the details that have just been set forth regarding memory 113, its writing access register 112 and its reading access register 114 hold true for memory 123, its writing access register 122 and its reading access register 124.

Multiplexer 152 does not make any directional switching operation. Contrarily, demultiplexer 153 performs a directional switching operation since the incoming line 156 is to be selectively connected to one out of the outgoing lines 1541 A, 1541 B, 1541 C. The make up of demultiplexer 153 is therefore analogous with that of the directional switching units describes later on.

In the subscriber station just described in reference to FIGS. 4 and 5, each terminal is fitted with its converter. This decentralization of the coding, decoding and packetizing functions allows a further terminal or an additional service to be included without requiring any modification other than an additional output to demultiplexer 153 and an additional input to multiplexer 152. However, to simplify the terminal equipment items, these functions may be more or less centralized by having some of them executed in an equipment item common to all the terminals.

FIG. 6 relates to a subscriber in which all the aforementionned junctions are performed through such a common equipment 160. Terminals 100 A, 100 B and 100 C are present as before. The other components or devices in the station consists of a switching network 105, a battery of voice filters 106 and 107, a battery of video signal filters 108 and 109, a coder 131, a decoder 132, a central memory 163, a transmission chain including a writing-in access register 162, a reading-out access register 164 and a parallel-to-serial converter 164 whose outputs is connected to the local exchange, a reception chain including a serial-to-parallel converter 171, a writing-in access register 172, a reading-out access register 174 and lastly a control unit 191 and a multiregister 192.

Coder 131 is connected to the output of filter 106 via a link 1061, to the output of filter 108 via a link 1081, and to the input of access register 162 via a bus 1311.

Decoder 132 is connected to the input of filter 107 via a link 1071, to the input of filter 109 via a link 1091 and to the output of access register 174 via a bus 1321. The said coder and decoder are also respectively connected directly to switching network 105 via lines 1051 and 1322 for exchange of digital signals with terminal 100 C.

As was the case for the previous example, the role of these various components will be expounded upon by examining how they work in the case of a telephone communication initiated in telephone 100 A.

When this telephone is free, its outgoing link 102 A is connected to multiregister 192 via switching network 105 and 1ink 1921. Once the subscriber lifts his handset 101 A, the multiregister is advised accordingly and informs control unit 191 via line 1911. Control unit 191 then gives switching network 105 an order via line 1912 to connect incoming line 103 A to filter 107 and it then instructs receiver reading-in access register 174, via line 1741, to read, cyclically and at a suitable rate, a zone in memory 163 that contains the samples of a period of the dial tone signal. This signal is delivered to receiver 103 A of handset 101 A via filter 107 and switching network 105.

Access register 174, that may be capable of simultaneously reading several zones in memory 163 destined for several terminals, such as 100 A, 100 B, 100 C, etc . . . and at different rates, integrates this new task into its cyclic scanning program. At the instants specified in this program that are determined on the basis of pulses delivered by the station time base (not shown), access register 174 reads and transmits to decoder 132, via bus 1321, the successive samples of the signal memorized in the memory zone in question, by stipulating the destination of this signal, i.e. the terminal 100 A, 100 B or 100 C concerned.

The dial tone signal converted into an analog signal by decoder 132 is thus routed towards input 103 A of handset 101 A via link 1071 and switching network 105. Upon receiving the dial tone, the subscriber dials the called party's number which is routed via outgoing link 102 A, switching network 105, link 1921 and enters multiregister 192. Upon reception of the first figure in the number, the multiregister, via link 1911, informs control unit 191 that in turn asks register 174 to interrupt transmission of the dial tone signal delivered by the corresponding zone in memory 163.

Upon completion of the dialing operation, multiregister 192 transmits the call number to control unit 191 that forms a call service packet as defined earlier on, in memory 163, via link 1913. Control unit 191 then gives reading-in access register 164 the instruction, via link 1914, to read and transmit the service packet thus constituted along the first free channel.

Access register 164 can be capable of simultaneously reading several zones in memory 163. It multiplexes the various outputs corresponding to these zones in bus 1641 that links it to parallel-to-serial converter 165. The latter retransmits the service signal corresponding to this parallel multiplexed signal along the subscriber's line 1651.

The local exchange replies by a service packet which may be a ringing tone, busy tone, route search tone . . . packet.

In the example examined here, the function of directionally switching the packets received in terms of the terminal to which they are addressed is assumed by writing-in access register 172.

For storing the service packets in memory 163, control unit 191 assigns via link 1721 as many storing zones as there are packets capable of being simultaneously received. The addressed terminal is recognized due to the routing address in the packet address field. When a service packet is stored in one of the zones reserved in memory 163, access register 172 informs control unit 191 via link 1721.

Control unit 191 records the instruction contained in the said service packet and orders reading access register 174 to transmit cyclically the content of a memory zone allocated to the tone corresponding to the service packet.

When the called subscriber lifts the receiver, the local exchange informs control unit 191 by means of a communication-making service packet whose address field contains the switching address as regards routing towards the called subscriber. Control unit 191, through switching network 105 (line 1912) causes directional switching of outgoing line 102 A towards filter 106, orders coder 131 (line 1915) to integrate the output of filter 106 into its cyclic scanning program and respectively informs access registers 162, 164, 172 and 174 as to which memory zones they must work on in alternance to provide the communication, via lines 1622, 1914, 1721 and 1741. The zones ascribed to access registers 172 and 174 are the same in the event of access register 172 stripping the packets, whose recording it controls, of their service signals.

The zones of memory 163 are not assigned to the data terminal equipments 100 A to 100 C but rather to the messages to be sent thereby, particularly when these messages are service packets. Control unit 191 knows the address of the actually used memory zones and it also knows the data terminal equipment which is being operated. It thus controls switching network 105 through line 1912.

When a packet to be transmitted has been formed, writing-in access register 162 informs reading-out access register 164 via control unit 191 in order that the latter may control transmission towards the local exchange via converter 164 and line 1651.

Up until this stage, consideration has been given to the case of station 100 A in FIG. 6 being the caller. If however, this terminal were to be called, then writing-in access register 172 receives the corresponding call packet from line 1711 and converter 171. It memorizes it and informs control unit 191 via line 1721 accordingly. Control unit 191 learns of the instructions contained in the packet and, via reading-out access register 174 and switching network 105, causes the emission of a ringing tone towards terminal 100 A.

When the called party, in this case the subscriber in question, lifts the handset, multiregister 192 is so advised by means of switching network 105 and line 1921. Control unit 191, informed by line 1911, has a "receiver-lifted" indication service packet transmitted to the local exchange via reading-out access register 164. The local exchange responds with a "call-put-through" service packet carrying the addresses for routing towards the caller. The communication establishment procedure comes into effect in the same manner as if the subscriber in question were the caller.

If, at the end of a communication, he who hangs up first is the subscriber considered here, then coder 131 detects the absence of a signal along the incoming line to the coder which had been given over to the communication and informs control unit 191 accordingly via line 1312. The control unit acts on switching network 105 via line 1912 to disconnect filter 107 from the receiver 101 A input and to connect the receiver output to multiregister 192. It respectively orders coder 131 and decoder 132 to cease sampling and decoding of the signals to and from the data terminal equipment considered and then orders the four access registers 162, 164, 172 and 174 to clear the memory zones that had been employed for the communication. Finally, it orders access register 164 to transmit a "communication-over" service-packet to the local exchange. The system then sends to the subscriber making the call, the tax details.

The description will now be broached of an embodiment example dealing with a directional switching unit constituting the basis of a switching network.

By looking first of all the FIG. 7, it can be seen that the directional switching unit DW it represents must fulfil the following functions. The links CL, LL and EL of FIG. 1 have been broken down into input channels IC and output channels OC, the latter being grouped into output bundles OB. The directional switching unit DW detects the packet start and end words. When it detects a packet start word along one of channels IC, it records the first address contained in the address field and then quasi-instantaneously establishes the spatial link between this input channel and one of the free output channels OC belonging to output bundle OB defined by this first address. If all the channels OC in the output bundle OB are engaged, then it orientates the packet along an overflow channel leading to a buffer memory BM for storage until such time as one of the said output channels becomes clear. When it has detected a packet-end word along one of the input channels IC, it cuts the link with the output channel OC taken in order to free the channel OC and then checks that no packet is waiting or delayed in the direction of the bundle comprising this channel. If such a packet is on stand-by in one of memories BM, then it establishes a link between this memory and the channel.

FIG. 8 shows a block-diagram depicting the directional switch DW. It comprises:

an input channel equipment 200 inserted in each input channel;

a common bus 300;

a directional switching unit 500;

an overflow channel 320' giving access to buffer memories 600 that are in fact the memories BM shown in FIG. 7;

an output channel equipment 700 inserted in each output channel OC.

Equipment 700 is optional.

The case considered, first of all, will be that of the directional switch with no output channel equipment 700.

Each input channel equipment 200 then detects the packet start word and end word along the corresponding input channel IC, records the routing address intended for the directional switching unit and transmits connection and disconnection orders to switching network 300 by means of bus 400. It furthermore transmits the packet to directional switching unit 300 via a link 202 after having deleted the address that was intended for it.

Switching network 300 establishes, in real time, a spatial link between link 202 routing a packet and one of the output channels OC of the bundle OB designated therefore and breaks this link once this packet has been transmitted.

Directional switching unit 500 settles any conflicts over access to bus 400. Switching network 300 for its part, has its own circuits for processing the connection and disconnection orders transmitted by bus 400. It makes and breaks the link 202 connection with one of the free channels OC of the given bundle OB, or if all the channels in this bundle are engaged with one of overflow channels 320' (CD in FIG. 7) leading to one of buffer memories 600. Each one of these memories has access to bus 400. It retransmits each packet read to switching networks 300 via an input channel 202' accordingly ascribed to it.

FIG. 9, to recap, is a block diagram of one of input channel equipment items 200 (FIG. 8), still in the case of a directional switching unit that does not comprise any output channel equipment 700. This equipment 200 comprises two circuits, one of them 210 fulfilling the role of packet detector and heading address deleter, and the other 250 providing connection order transmission along bus 400.

The principal component in circuit 210 is a shift register 211 in which the packet bits routed by the input channel IC follow each other. It comprises an address zone or field 212, a detection zone 213 and a delay zone 214.

When a packet advances through register 211, the packet start words are detected as soon as they reach detection zone 213 by a wired comparison circuit 215 whose two inputs are respectively connected to said zone 213 and a packet start word memory 216. The packet head routing address is located at this precise moment in address field 212. Upon recognizing a packet start word, comparator 215, via a link 217, controls the closing of a by-pass circuit 218 that short circuits address zone 212. All the packet signals following the head address are then introduced directly into detection zone 213 without travelling through address zone 212 which keeps the directional routing address in store throughout the packet routing duration. The packet which is thus transmitted to delay zone 214 has therefore lost its head address. Zone 214 makes it possible to compensate for the time between the moment where the start of the packet was detected by comparator 215 and the moment where switching network 300 (FIG. 8) makes the connection for routing the packet that is transmitted to it by link 202 from the output of register 211.

The output of comparator 215 is connected not only to the control input of by-pass circuit 218 via link 217 but also to the control input of a flip-flop 221 and, through an OR gate 222, to the control input of a flip-flop 251 belonging to circuit 250.

The packet start word detection signal delivered by comparator 215 causes the appearance of a so-called "connection" signal at the output of flip-flop 221 and the appearance of a request signal for access to bus 400 at the output of flip-flop 251.

When the packet end word arrives in detection zone 213 of register 211, it is detected by a second comparator circuit 225 whose two inputs are respectively connected to the said detection zone and a packet end word memory 226. Comparator 225 then delivers a bus acces request signal to flip-flop 251 via delay circuit 227 and OR gate 222. Circuit 227 imposes a delay TD+TR on this signal, where TD is the signal transit time in detection zone 213 and TR is the transit time in delay circuit 214. The term TR is determined such that it is equal to at least the maximum connection time TC of switching network 300 (FIG. 8) so that the packet start will not reach the said network until the connection has become effective. The access request signal of comparator 225 is also transmitted to the input RS (reset) of flip-flop 221 and, through a delay circuit 228 and a link 229, to by-pass circuit 218. After a time TD+TR, the output of flip-flop 221 provides a disconnection signal whilst the reset of circuit 218 (opening of the address zone 212) is deferred until the disconnection has been made. Circuit 228 in fact imposes an additional delay lasting TC on the opening of circuit 218, in order to avoid any content disturbance in address zone 212 during the disconnection phase, as such disturbance could give rise to an early arrival of a new packet. The content of the address field 212 is transmitted by means of an AND gate 252 to circuit 250 under conditions that will be examined at a later stage. This AND gate at the same time ensures transmission of the signal polarity existing on a wire 2211 connected to the output of flip-flop 221 towards connection or disconnection control wire 403 of bus 400.

Bus 400 further comprises a status wire 404 whose polarity indicates whether or not the bus is engaged.

In circuit 250, a flip-flop 257 connected to wired 404 delivers a free bus test polarity. This enables an AND gate 258 to transmit the flip-flop 251 access request signal to a flip-flop 256. The latter flip-flop then delivers the "engaged" polarity to status wire 404 via a wire 261 and a diode 262.

This test device 257 of the bus status does not wholly eliminate access conflicts when several input channels IC are attempting to seize bus 400 simultaneously. To overcome these conflicts, a so-called "authorization to connect" wire 405 is added to bus 400. Directional switching unit 500 (FIG. 8), an embodiment example of which will be given hereafter, delivers pulses through wire 405 which is connected in series to all the input channel equipments 250. Circuit 250 comprises a directional switch 253. When the input channel in question appropriates the bus, this directional switch interrupts wire 405 downstream thereof, i.e. towards the channel equipments 250 of the following channels. The connection authorization pulse is then routed towards AND gate 252 to authorize the connection of wires 2121 (address signals) and wire 2211 (connection or disconnection signal) to bus 400. The authorization to connect pulse is also delivered to a flip-flop 255 and a wire 254 intended for the "horizontal" control of switching network 300 (FIG. 8). This network 300 will be described later. The end of the authorization to connect pulse is detected by flip-flop 255 which acts upon a reset flip-flop 259. This flip-flop connected to the reset RS inputs of flip-flop 251, 255 and 256 and of directional switching circuit 253, gives rise to their reinitialization and hence frees the bus by the input channel equipment. It will be seen hereafter that switching network 300 (FIG. 8) establishes the connection and that the packet then flows via register 211 towards the channel of the output bundle selected by the said switching network.

In the embodiment lay-out of the input channel equipment as it has just been described:

the various input channel equipments are served in a preferential order imposed by their cascaded connection to wire 405;

the time interval between two successive packets of the same input channel must be longer than $TD+TR+TC=2TC+TD$.

The minimum interval required between two successive packets in each input channel can be reduced to TC, by simplifying the disconnection procedure. In this solution, components 221 and 228 are removed as are links 2211 and OR gate 222. Bus wire 403 (connection-disconnection order) is also done away with. Having done this, a wire 2271 (dashed line) must be added to the input channel equipment, where such a wire is a "horizontal" control wire enabling all the crosspoints of the said input channel to be reset to zero. Since the bus is no longer acted upon for the disconnection, the traffic it carries is cut by half. This solution does not, however, allow overflow memories 600 (FIG. 8) to be informed of when the channel OC of a saturated bundle OB becomes free.

The minimum interval required between two successive packets in an input channel may also be reduced by ordering, whilst a new connection with the said input channel is being established, the automatic clearing of all the other crossponts ascribed to the said channel in connection network 300 (FIG. 8). FIG. 10 illustrates the modifications to be incorporated in the lay-out of detection circuit 210 of the input channel equipment of FIG. 9.

Beside the components illustrated in FIG. 9, circuit 210 (now carrying the reference 210 A) further comprises an address register 231, and address transfer circuit 232, a flip-flop 233 and a gate 234. Address register 231 and transfer circuit 232 are interposed between the address zone of shift register 211 and links 2121. Flip-flop 233 and gate 234 are interposed between the output from comparator 215 and the corresponding input of OR gate 222. Gate 234 is and AND gate having a direct input connected to the output of flip-flop 233 and an inverted input connected by a wire 2341 to wire 254 of FIG. 9 and hence to switch 253. Address transfer circuit 232 is activated by the output of gate 234 (wire 2342) when comparator 215 delivers a packet start word detection signal, provided however a disconnection order, is not undergoing transfer along the bus (i.e. provided there is no authorization to connect pulse along bus wire 405) or provided the bus if free (end of the authorization to connect pulse). Register 231 prevents a new packet entering along the corresponding channel IC from disturbing the preceding address of a disconnection perhaps in progress.

By inserting an output channel equipment 700 (FIG. 8) satisfying certain functions hitherto entrusted to the input channel equipment items into each output channel, the minimum necessary time interval between two packets can be reduced to zero. FIG. 11 depicts the lay-outs of an input channel equipment item and an output channel equipment item in which the input channel comprises the already described means for packet-start detection, switching control and the delay circuit intended to compensate for time taking in establishing the connection, whereas the means for providing disconnection and address deletion which was intended for the directional switching unit have been carried over to the output channel equipment, together with the means for removing any parasite information which may precede or follow the packet as a result of its nearness to the preceding of following packet in the input channel.

Connection order transmission circuit 250 (FIG. 10) of the input channel equipment is not modified and is thus shown simply by a rectangle block.

As regards the packet detection circuit for this equipment (which carries reference 210 B in FIG. 11), it differs from circuit 210 A in FIG. 10 as a result of the removal of the following items;

by-pass circuit 218 for address zone 212 in register 211;

bus request flip-flop 233;

gates 222 and 234;

delay line 227.

As far as the output channel equipment is concerned, it comprises two circuits, namely on the one hand, a circuit 700 which deletes the address intended for the directional switching unit in question and removes any parasite signals that might precede or follow the packet that is to flow and, on the other hand, a circuit 750 charged with controlling the output channel OC disconnection. This circuit 750, whose make-up is identical to that of circuit 250, is also represented by a simple rectangle. Circuit 700 comprises:

a shift register 711 comprising firstly an address zone 712 whose input is connected to corresponding output link 320 (FIG. 8) of the switching network 300 via a switch 723 and secondly a detection zone 713;

a packet end word detection circuit comprising a comparator 715 whose two inputs are connected to detection zone 713 and a packet end word memory 716 respectively;

a packet start word detection circuit comprising a comparator 725 whose two inputs are connected to detection zone 713 and a packet start word memory 726 respectively;

an address by-pass circuit 728 whose closure causes short-circuiting of address zone 712; and a disconnection polarity circuit 712 whose output is connected to corresponding wire 403 of bus 400 via an AND gate (not shown) belonging to circuit 750 and connected in the same fashion as gate 252 in circuit 250 (see FIGS. 9 and 10).

The appearance of a packet start word detection signal at the output from comparator 725 causes, on the one hand, closure of address by-pass 718 in order to delete, at the output of the switching unit and no longer at the input thereof, the address that was destined for the directional switching unit in question and, on the other hand, closure of switch 710, thereby letting the packet flow along output channel OC after suppression of any parasite information that may perhaps precede the packet. The detection of a packet start word further causes activation of status flip-flop 724 that indicates thus whether a packet is being transmitted.

The appearance of a packet end word detection signal at the output of comparator 715 activates flip-flop 724 to allow removal of any parasite signal that may perhaps precede the packet to be transmitted. This strobing is achieved by means of AND gate 722. The detection of the packet end word signal thus permits the dispatch of a disconnection request to circuit 750 via a wire linked to the bus request flip-flop 251 (FIG. 10) of the said circuit as well as opening of switch 723 for the purpose of eliminating the parasite signals that may be following the packet. After execution of the disconnection order, circuit 750 transmits re-initialization signals to the RS inputs of switches 710 and 723, by-pass circuit 718 and flip-flop 724.

With reference now to FIGS. 12 and 13 on a simultaneous basis, the description will be developed of an embodiment of switching network 300 (see FIG. 8) included in a directional switching unit.

FIG. 12 depicts a simplified switching network which comprises three incoming channels (IC) 202, the bus 400 and two outgoing bundles (OB). Each outgoing bundle (OB) includes three outgoing channels (OC) 320. The directional switching unit further comprises two overflow channels 320' (see FIG. 8). Associated with each incoming channel 202 is a control wire 254 (FIG. 9) emanating from the corresponding incoming channel equipment. Associated with each outgoing channel 320 is a control wire 321 whilst associated with each overflow channel 320' is a control wire 321'. All control wires 321 of the channels within one and the same outgoing bundle are connected to the outputs of an outgoing channel and bundle selection circuit 340.

All control wires 321' related to the overflow channels are connected to the output of an overflow channel selection circuit 350. Circuits 340 and 350 act according to the signals taken from bus 400. Connection and disconnection controlling wires 403 (see FIG. 9) is depicted as being separated from the other wires of bus 400. Each connection between a given incoming channel 202 and a given outgoing channel 320 or overflow channel 320' is provided via a crosspoint 360 which is controlled by wire 254 and wire 321 or 321'.

FIG. 13 shows a part of the switching network of FIG. 12, namely a channel incoming wire 202 and the associated control wire 254, the first and second outgoing channel wires of one of the outgoing bundles (i.e. wire 320A and wire 320B), control wires 321A and 321B related thereto, an overflow wire 320' and its control wire 321' and lastly, three crosspoints 360X, 360A and 360B whose control enables wires 320', 320A and 320B to be connected to wire 202. Each crosspoint is a connection flip-flop 360 having two control inputs which are respectively connected to the one hand, to control wire 254 via link 361 and, on the other hand to respective control wire 321A, 321B or 321' via a link 362. When the flip-flop simultaneously receives two control pulses via these two links, it establishes the connection between wire 202, on the one hand, and appropriate wire 320A, 320B or 320', on the other hand, via links 363 and 364. It cancels this connection when, once established, a pulse is transmitted on wire 254. It then delivers a so-called "releasing" signal, referred to at a later stage herein, to respective control wire 321A, 321B or 321' via a link 365.

FIG. 13 also depicts, on the one hand, circuits which are included in outgoing channel and bundle selection circuits 340A and 340B (FIG. 12) and associated with control wires 321A and 321B, and on the other hand circuits which are included in overflow channel selection circuit 350 and associated with control wire 321'.

It will be recalled that channel 320 A is the first outgoing channel of the outgoing bundle in question, channel 320 B is the second and is followed by channels 320 C, 320 D, etc. (not shown). Flip-flop 345 A, 345 B, etc. whose role will be defined later on will be overlooked for the time being.

Memory cell 341 contains the address ascribed to aid bundle. (It is recalled that only the bundle has an address which is common to all the outgoing channels it comprises). When the address routed by the address wires of bus 400 is identical to the memorized bundle address, then comparator 342 and AND gate 343 deliver a connection signal to flip-flop 344 A, provided, however, wire 403 is carrying a connection signal. If outgoing channel 320 A is free, i.e. when none of the crosspoints linked to outgoing channel 320 A, namely crosspoint 360 A and the following ones, connects this channel 320 A at this particular moment to any incoming channel, flip-flop 344 A connects wire 321 A to the output of AND gate 343; the crosspoint 360 A which simultaneously receives connection pulses via wire 361 and wire 362 (see hereabove, in reference to FIG. 9, the operation of incoming channel equipment 210), connects incoming channel 202 to outgoing channel 320 A. If this outgoing channel is engaged, flip-flop 344 A holds the output of gate 343 in connection with the input of flip-flop 344 B via flip-flop 345 B and the connection pulse will be delivered to wire 321 B, provided however flip-flop 344 B connects its own input to wire 321 B. The same process enables the connection pulse to be delivered to flip-flop 344 C (not shown) and so on and so forth, up to the first free outgoing channel of the bundle in question.

In this manner, the selection of an outgoing channel based on the address transmitted along bus 400 is performed in two stages, firstly by identification of the outgoing bundle concerned and next by selection of the first free channel, taken in a given order from said bundle.

Overflow flip-flops 345 A, 345 B, etc. and overflow channel selecting circuit 350 come into operation when all outgoing channels 320 of the same bundle are busy. There are naturally several overflow channels although only one such as channel 320' is shown. It will be recalled that these overflow channels make it possible to directionally switch those packets that cannot be routed by an outgoing bundle towards memories 600 (FIG. 8) until such time as a channel in said bundle becomes free.

Each memory cell 341 A, 341 B, etc. stores a bit OF referred to as an "overflow" bit whose value controls the state of the corresponding flip-flop 345 A, 345 B, etc. via a control link 346 A, 346 B, etc. Each flip-flop 345 is linked through its signal input to the flip-flop 344 of the outgoing channel that precedes it, and enables this to be connected either, if it is the last channel in a bundle (bit OF=1), to overflow wire 311 or, if said channel is not the last one (bit OF=0), to flip-flop 344 of the channel that follows it. When a packet is intended for a bundle whose channels are all busy, then the connection pulse delivered from comparator 342 A of the first channel of the bundle is supplied through all flip-flop 344 and 345 of this bundle towards overflow wire 311 which applied it to the input of directional switching flip-flop 344 X of the first channel of the overflow bundle. This first free overflow channel is selected by the same procedure as the first free channel in an outgoing bundle. In principle, a single comparator 342, a single memory 341 and a single AND gate 343 per bundle will suffice.

A detailed description of control unit 500 included in the directional switching unit will not be proffered here. Its role amounts to no more than settling conflicts over access to bus 400.

Control unit 500 continuously tests the signal on wire 404. As soon as it detects a busy signal along this wire, it delivers a pulse along wire 405 for a period which is long enough to set up a connection or disconnection.

Referring to FIG. 14, is now detailed an embodiment of one of overflow buffer memories 600 in FIG. 8.

The part 610 of a memory 600 whose capacity is sufficient to store a packet having a maximum length, is connected:

through its writing-in input 611 to respective overflow channel 320' (FIG. 3);

through its reading-out output 612 to a respective incoming channel 202' of switching network 300 (FIG. 8);

through its control input 613 to wire 405 of bus 400 (FIG. 9) for channel selection.

The memory part 610 further has an output 614 which delivers a releasing control signal at the end of reading.

The respective circuit associated with the memory part 610 comprises:

a logic circuit 600 having three inputs 651, 652 and 615, which are connected to respective control wire 321', connection-disconnection wire 403 of bus 400 (FIG. 9) and output 614 of memory part 610 respectively;

a storing control circuit 620 which is energized by an output 653 from logic circuit 650;

a register 630 controlled by control circuit 620 for memorizing and presenting at its output 631 the address signals to be routed via the bus 400 address wires;

a comparator 640 having two inputs 641 and 642 which are connected to the output 631 of register 630 and to bus 400 address wires respectively;

a flip-flop 660 whose control input 661 is connected to output 653 of logic circuit 650 and whose signal input 662 is connected to another output 654 of logic circuit 650.

a connection signal setting circuit 670 having an input 671 which is connected to memory input 614, an input 672 which is connected to the output of flip-flop 660, and an output 673 which is connected to connection-disconnection controlling wire 403 of bus 400 via AND gate 252 of circuit 250 (FIG. 9); and finally, an OR gate 680 whose two inputs are connected to the output of flip-flop 660 and output 614 of memory part 610 respectively and whose output is connected to the flip-flop 251 (see FIG. 9) of a connection order delivering circuit 250 (FIGS. 9 and 10).

In this circuit 250, the connections to a wire 202' (FIG. 8) and the wire 403 (connection-disconnection) of bus 400 can be seen as before. Control wire 254 associated with wire 202' (FIGS. 9, 12 and 13) can also be seen.

When control wire 321' transmits a pulse at the same time as a connection signal appears along wire 403, then control circuit 620 triggered by logic circuit 650 causes the address carried via bus 400 to be stored in register 630, or in other words, this register 630 stores the destination of the packet that will be stored in memory 610. When a channel in the destination outgoing bundle becomes free, comparator 640 checks the identity of the address stored in register 630 and the address routed via bus 400. Logic circuit 650 checks via its input 652 which is linked to wire 403, that it is indeed a disconnection and that the disconnection order is not an order sent to the memory channel in question (input 651 connected to the output wire 321') at the end of packet storing. Circuit 650 then delivers a bus request to circuit 250 via flip-flop 660 and gate 680 whereas circuit 670 sets a connection signal via its output 673 in the direction of bus 400. Flip-flop 660 supplies the signals outgoing from logic circuit 650 when a new packet storing signal arrives and stops the signals that might appear after reception of the signal for releasing a channel in the destination bundle and after initialization of the packet transmission.

A pulse is delivered via wire 405 of the bus 400 to control input 613 of memory part 610 which can then begin reading towards channel 202 as from the end of this pulse, since the connection is then made. At the end of reading, memory part 610 via its output 614 delivers a release order signal which is applied, on the one hand, to wire 321' so as to clear the memory and, on the other hand, to circuit 250 via OR gate 680. A link 615 between output 614 of memory 610 and the input of logic circuit 650 prevents circuit 250 from interpreting the releasing pulse on wire 321' as a connection pulse. A diode 616 prevents circuits 670 and 680 from making the inverse interpretation.

It should be noted that, in the embodiment described, releasing flip-flop 344 X (FIG. 13) for each seizing of the overflow channel 320' receives two successive releasing pulses which are emitted along wire 321', the first via crosspoint 360 X at the end of packet storing in the overflow memory, and the second via this memory at the end of packet retransmission. Unlike flip-flop 344 A and 344 B, flip-flop 344 X must count two releasing pulses before executing so that channel 320' cannot be reused during the memory tie-up time.

What we claim is:

1. Multiservice packet telecommunication network of the invention comprising:

a plurality of subscriber's stations each connected to several sources of analog data signals and digital data signals and including means for digitizing said analog data signals from those of said sources which are analog data signal sources;

a plurality of means in each subscriber's station for forming, transmitting and receiving packets constituted by said digital data signals and said digitized data signals, said packets having an information field, an address field and a start word and end word fields, said start word field preceding said address field;

packet switching networks, each connected to said subscriber's stations and to other packet switching networks through incoming and outgoing data channels;

means for inserting in the address field of the packet a sequence of addresses including a first, second, .. . $n^{th}$ addresses defining the outgoing data link of the first, second, ... $n^{th}$ switching networks included in the route of the packet between a packet sender station and a packet receiver station; and it is characterised in that the outgoing channel from each switching network towards other switching networks and the subscriber stations are associated in groups of a plurality of outgoing channels, the whole group having one and the same address common to all the channels of the group and the switching network further comprises means (342A, 342B) for detecting said common address of a group in the address field of a packet conveyed in an incoming channel; and means (344A, 344B) controlled by said address detecting means for searching a free-non-addressed outgoing channel of the group, said searching means connecting said free outgoing channel to said incoming channel.

* * * * *